(12) United States Patent
Dhaundiyal

(10) Patent No.: US 9,146,914 B1
(45) Date of Patent: Sep. 29, 2015

(54) SYSTEM AND METHOD FOR PROVIDING A CONTEXT SENSITIVE UNDO FUNCTION

(75) Inventor: Rahul Dhaundiyal, Hyderabad (IN)

(73) Assignee: Google Inc., Mountain View, CA (US)

( * ) Notice: Subject to any disclaimer, the term of this patent is extended or adjusted under 35 U.S.C. 154(b) by 116 days.

(21) Appl. No.: 13/399,064

(22) Filed: Feb. 17, 2012

(51) Int. Cl.
*G06F 17/00* (2006.01)
*G06F 17/24* (2006.01)

(52) U.S. Cl.
CPC .................................... *G06F 17/24* (2013.01)

(58) Field of Classification Search
CPC ........................................................ G06F 17/24
USPC .......................................................... 715/234
See application file for complete search history.

(56) References Cited

U.S. PATENT DOCUMENTS

| | | | |
|---|---|---|---|
| 4,815,029 A * | 3/1989 | Barker et al. ................. | 715/205 |
| 5,659,747 A * | 8/1997 | Nakajima ......................... | 713/1 |
| 6,185,591 B1 | 2/2001 | Baker et al. | |
| 6,192,378 B1 | 2/2001 | Abrams et al. | |
| 7,111,013 B2 | 9/2006 | Federighi et al. | |
| 2007/0143335 A1 * | 6/2007 | Antoch et al. ................. | 707/102 |
| 2009/0249239 A1 * | 10/2009 | Eilers ............................. | 715/769 |
| 2010/0186002 A1 * | 7/2010 | Friedman et al. ............. | 717/116 |
| 2011/0098963 A1 | 4/2011 | Mukkavilli | |

* cited by examiner

*Primary Examiner* — Kavita Padmanabhan
*Assistant Examiner* — Andrew McIntosh
(74) *Attorney, Agent, or Firm* — Ropes & Gray LLP

(57) ABSTRACT

A context sensitive undo feature undoes a first change in a document without affecting other changes made by other contexts. A first change is applied within a document. A context of the first change is determined. First data related to the first change is stored in a first stack in response to determining that the first change is associated with a first context. A second change is applied within the document, the second change occurring after the first change. A context of the second change is determined. Second data relating to the second change, associated with a second context, is stored in a second stack. An instruction to undo the first change is received, and an undo function to undo the first change based on the first data is performed without affecting the second change in response to determining that the undo instruction is associated with the first context.

17 Claims, 10 Drawing Sheets

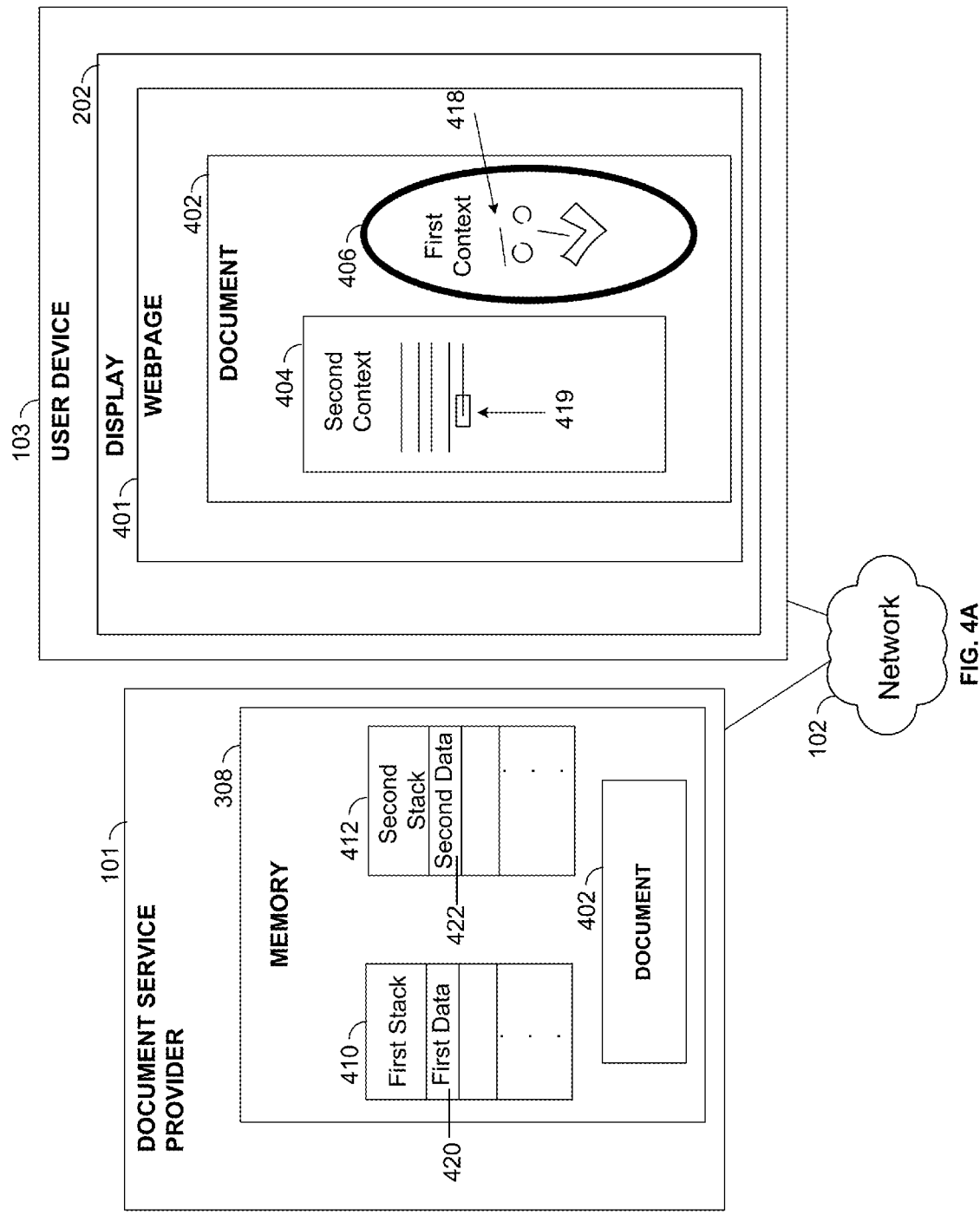

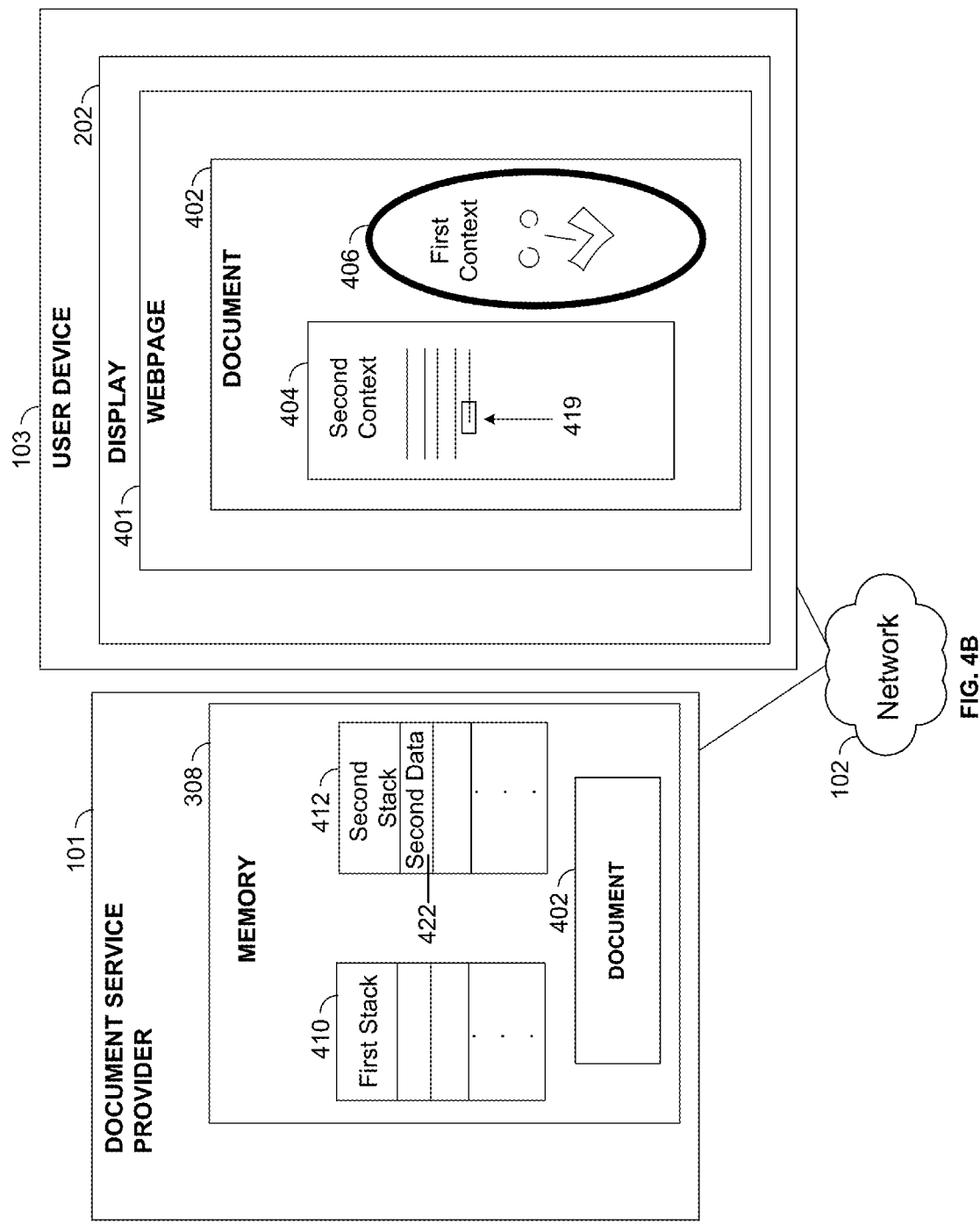

SYSTEM AND METHOD FOR PROVIDING A CONTEXT SENSITIVE UNDO FUNCTION

TECHNICAL FIELD

This specification relates generally to systems, methods and apparatus for providing document management services, and more particularly to systems, methods and apparatus for providing a context sensitive undo function.

BACKGROUND

Existing document editing systems may allow for manipulation of more than text. Other contexts that may be edited include, for example, images, tables, and other forms of multi-media. Existing document editing systems allow users to undo edits to a document using an undo command. In existing systems, the undo command may be invoked, for example, through the use of keystrokes (e.g. CTRL+Z) or by selection of an icon (e.g. an undo icon displaying an arrow pointing left). Upon being initiated or selected, the undo command typically causes the most recent change made within the document to be reversed, causing the document to revert to a previous state.

SUMMARY

In accordance with an embodiment, a first change is applied within a document. A context of the first change within the document is determined. First data related to the first change is stored in a first stack in response to determining that the first change is associated with a first context. A second change within the document, occurring after the first change, is applied. A context of the second change within the document is determined. Second data relating to the second change is stored in a second stack in response to determining that the second change is associated with a second context that is different than the first context. An instruction to undo the first change is received. It is determined that the undo instruction is associated with the first context. An undo function is performed to undo the first change based on the first data without affecting the second change in response to determining that the undo instruction is associated with the first context.

In another embodiment, performing an undo function to undo the first change based on the first data without affecting the second change is in response to receiving a selection of data contained within the first context. In another embodiment, the selection of data is based on context criteria.

In another embodiment, the first context and the second context are displayed on a webpage.

In another embodiment, redo command to restore the first change to the first context is applied.

In another embodiment, second instruction to undo the second change is received and an undo function to undo the second change based on the second data is performed without affecting the first context.

In another embodiment, a third change to a third context within the document is applied. A context of the third change is determined within the document. Third data relating to the third change is stored in a third stack in response to determining that the third change is associated with a third context. The first stack and the second stack may be combined to generate a universal stack.

In another embodiment, the third context is different than the first context. In another embodiment, the third context is different than the second context.

BRIEF DESCRIPTION OF THE DRAWINGS

FIG. 4A illustratively depicts a document displayed on a webpage and documents stored at a document service provider in accordance with an embodiment;

FIG. 4B illustratively depicts the document of FIG. 4A displayed on a webpage after an undo command is applied in accordance with an embodiment;

DETAILED DESCRIPTION

Figure 1:
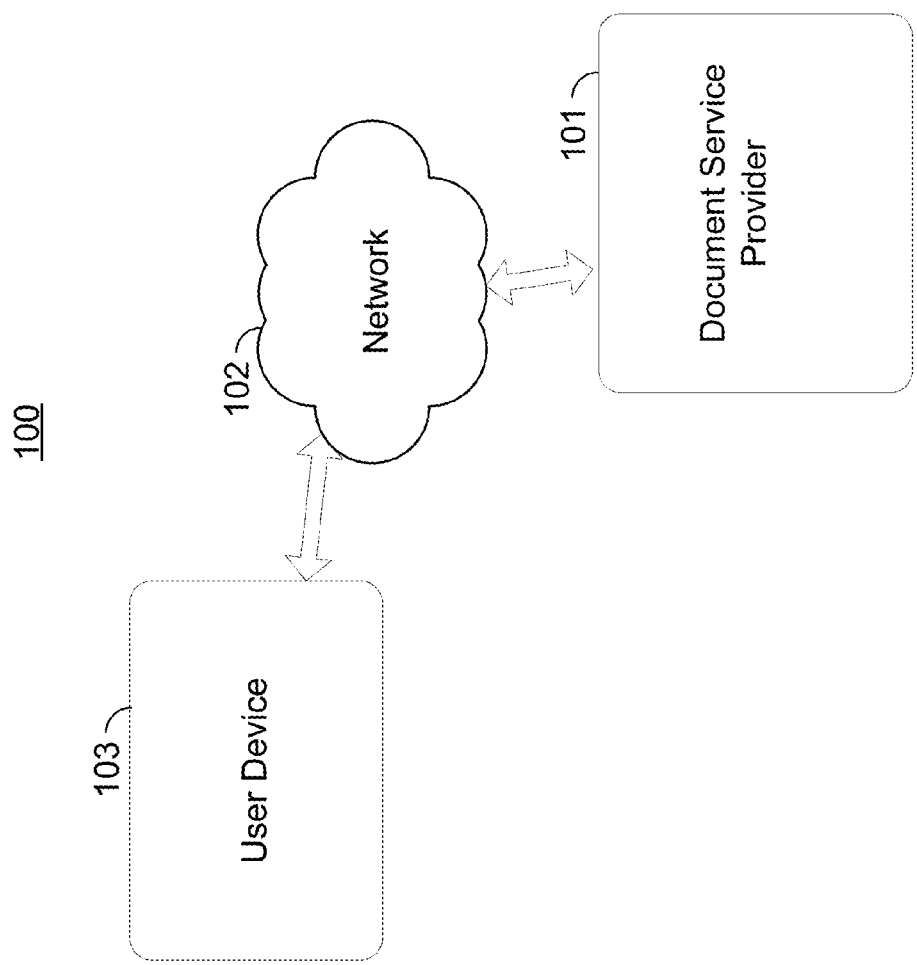
FIG. 1 illustratively depicts a communication system in accordance with an embodiment.

FIG. 1 shows a communication system 100, according to an embodiment. Communication system 100 includes a user device 103 and a document service provider 101. These devices and/or servers communicate with each other using network 102.

In the exemplary embodiment of FIG. 1, network 102 is the Internet. In other embodiments, network 102 may include one or more of a number of different types of networks, such as, for example, an intranet, a local area network (LAN), a wide area network (WAN), a wireless network, a Fiber Channel-based storage area network (SAN), or Ethernet. Other networks may be used. Alternatively, network 102 may include a combination of different types of networks. In an alternative embodiment, the functions of user device 103 and the functions of document service provider 101, as described herein, may be implemented by various components of a single computer system.

Figure 2:
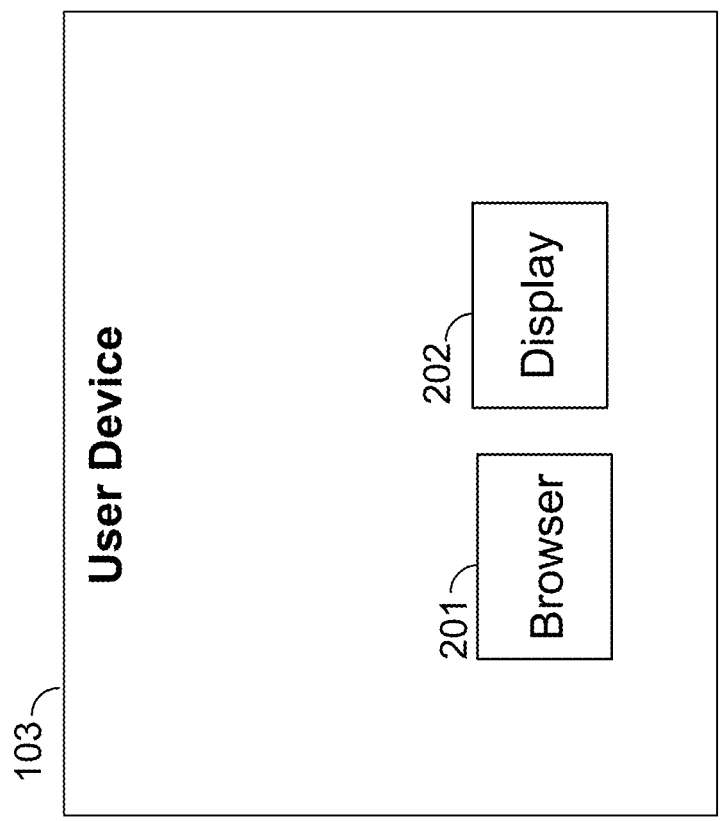
FIG. 2 illustratively depicts functional components of an exemplary user device in accordance with an embodiment.

FIG. 2 shows functional components of user device 103 in accordance with an embodiment. User device 103 includes a web browser 201 and a display 202. Web browser 201 may be a conventional web browser used to access World Wide Web sites via the Internet, for example. Display 202 displays, documents, text, images, software applications, webpages, and other information. For example, all or a portion of document 402 (shown in FIGS. 4A, 4B and 5) may be displayed on display 202.

User device 103 may be any device that enables a user to view website 402 via network 102. User device 103 may be connected to network 102 through a direct (wired) link, or in the illustrated embodiment, wirelessly. For example, user device 103 may be a personal computer, a laptop computer, a workstation, a mainframe computer, etc. In the illustrated embodiment, user device 103 may be a mobile communication device such as a wireless phone, a personal digital assistant, cellular device, a laptop computer, a netbook, a tablet device, an electronic book reader, etc. Other devices may be used.

Figure 3:
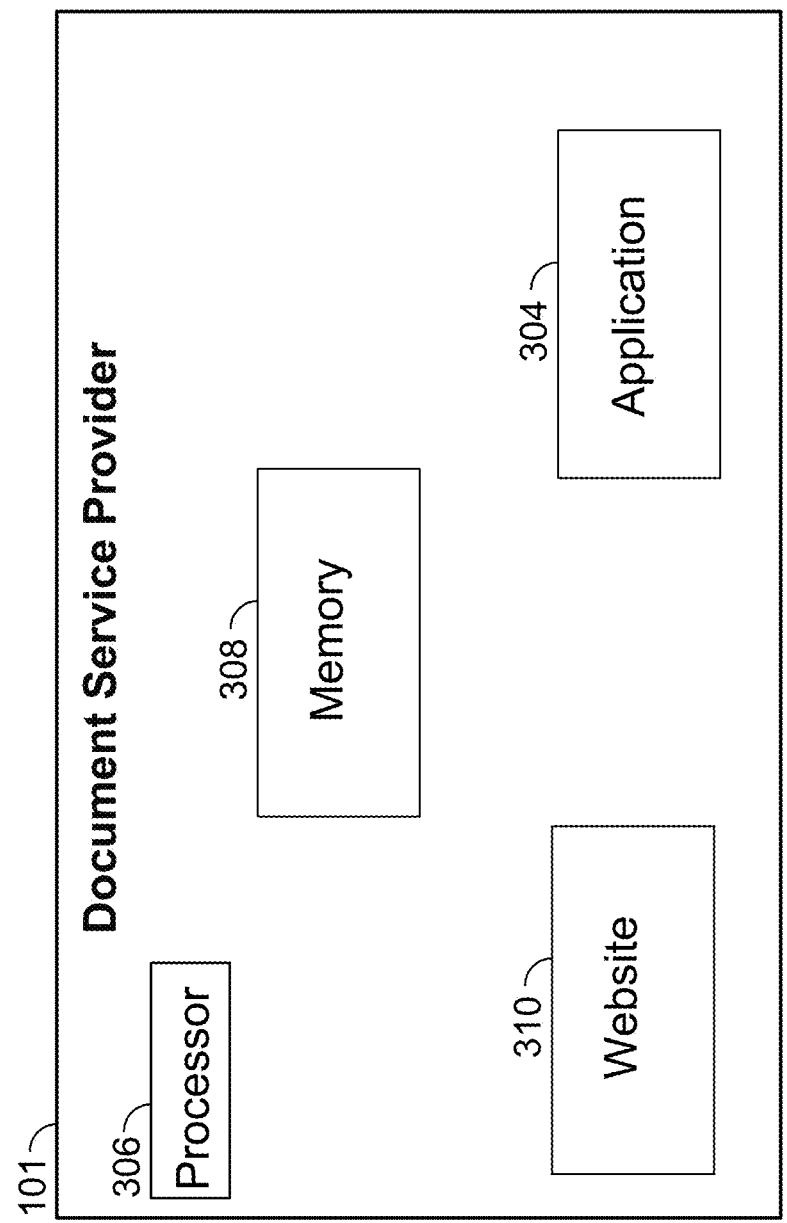
FIG. 3 illustratively depicts functional components of a document service provider in accordance with an embodiment.

FIG. 3 shows functional components of document service provider 101 in accordance with an embodiment. Document service provider 101 includes a memory 308. In the embodiment shown in FIG. 3, document service provider 101 also includes an application 304. However, in other embodiments, application 304 may not be stored at document service provider 101. Document service provider 101 may include a server, for example. In an embodiment, document service provider 101 is used by a user to store one or more documents and/or other data, such as one or more stacks.

In the illustrative embodiment, document service provider 101 hosts a website 310 that can be accessed by user device 103. User device 103 may access a World Wide Web page on website 310 that may be viewed using a conventional Web browser, for example. In one embodiment, a user using user device 103 may access website 310 to create and/or edit a document, such as document 402 shown in FIG. 4A.

The following detailed description discusses an illustrative embodiment of the present invention implemented using application 304 (shown in FIG. 3). Application 304 may include an editing or word processing system. However, it should be understood that the present invention may be implemented using any application or document editing system that edits any conceivable type of electronic document, and hence is not limited to word processing systems and may include, for example, spreadsheet editors, presentation editors, design editors, video editing systems, image editing systems, etc.

In accordance with an embodiment illustrated in FIG. 4A, a user employs browser 201 to access website 310 via network 102, and to view and/or otherwise access document 402 on a webpage 401. In one embodiment, document 402 is stored in memory 308 at document service provider 101. Document service provider 101 communicates with webpage 401 via communications network 102, and webpage 401 provides a visual representation of document 402 to the user via display 201 of user device 103. In other embodiments, document service provider 101 may be an application running at a standalone, non-networked computer system (e.g. a word processor). In one embodiment, document 402 may be accessed through an application running on user device 103.

In accordance with the embodiment illustrated in FIG. 4A, document 402 includes a first context 406 and a second context 404. In the illustrative embodiment, first context 406 is a drawing and second context 404 is text. Contexts 404 and 406 are merely illustrative and are not intended to be limiting. The terms context and context type may include any logical section of a document. Context types may include but are not limited to text, tables, images, video, or other data structures. A context may be divided into sub-contexts, each of which is considered a separate context. For example, in one embodiment, a context may include separate paragraphs or may be user selectable and assignable.

Returning to FIG. 4A, a first change 418 is made to first context 406. For example, first change 418 may be an eyebrow which is added to the drawing in first context 406. First data 420 corresponding to first change 418 is stored in a first stack 410, which is stored in memory 308 of document service provider 101. In some embodiments, first data 420 may include data that indicates the nature and location of first change 418. In other embodiments, first data 420 may include data that defines a reverse command corresponding to a command to reverse first change 418.

In the illustrative embodiment of FIG. 4A, after first change 418 is made, a second change 419 is made to second context 404. For example, second change 419 may be an addition of text (e.g., a sentence, a paragraph, a word, a character, etc.) to a paragraph in second context 404. Second data 422 corresponding to second change 419 is stored in second stack 412, which is stored in memory 308 of document service provider 101. In some embodiments, second data 422 may include data that indicates the nature and location of second change 419. In other embodiments, second data 422 may include data that defines a reverse command corresponding to a command to reverse second change 419.

FIG. 4B illustratively depicts the document of FIG. 4A displayed on a webpage after an undo command is applied in accordance with an embodiment. FIG. 4B depicts webpage 402 after an undo command removes an eyebrow inserted by first change 418 in first context 406. FIG. 4B also depicts first stack 410 (stored in memory 308 of document service provider 101) after first data 420 is removed. Details of how first change 418 is undone without affecting second context 404 and second stack 412 are described herein with reference to FIGS. 5 and 6.

Figure 5:
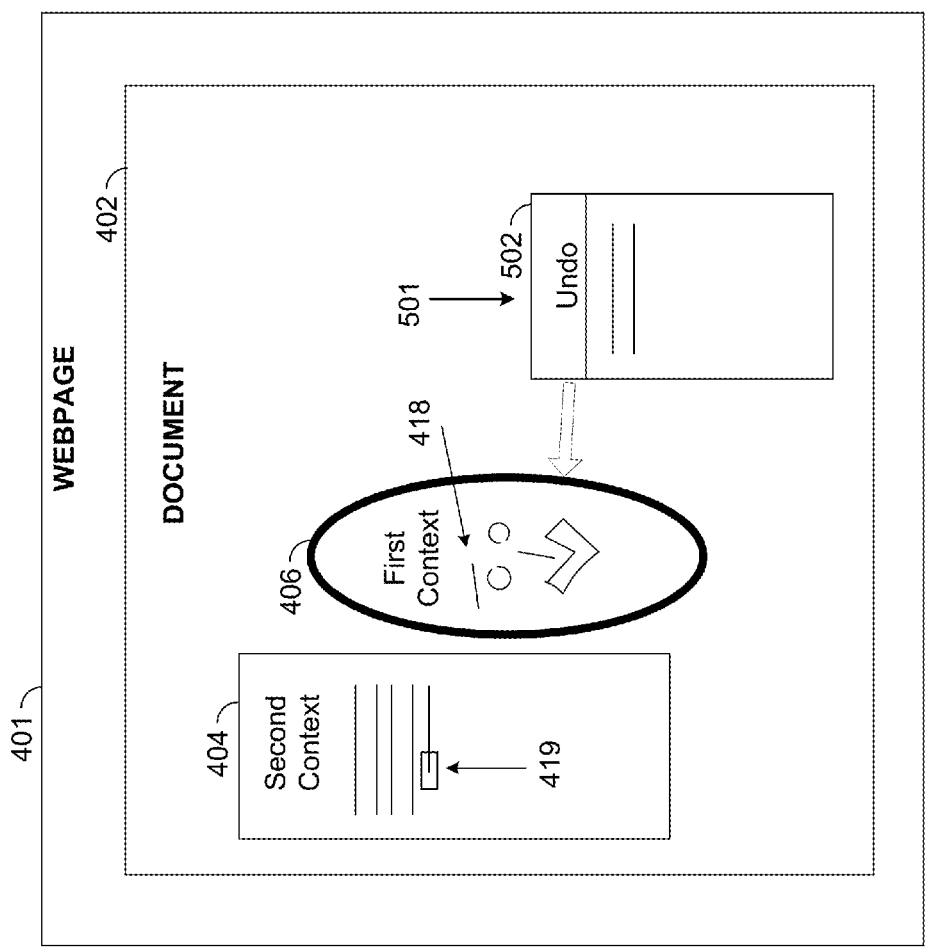
FIG. 5 illustratively depicts a document and selection menu displayed on a webpage in accordance with an embodiment.

FIG. 5 represents a document and a menu generated by selection (e.g. a right click) displayed on a webpage in accordance with an embodiment. Specifically, when a user selects (e.g. right-clicks on) a context, menu 501 is displayed. Among the options listed in menu 501 is a context sensitive undo option 502. In the illustrative embodiment, context sensitive undo option 502 may be labeled as "undo", "context sensitive undo", etc. In another embodiment, a graphical representation of the undo command (e.g. an icon) or a combination of text and graphics may be displayed. In another embodiment, options for traditional global undo and context sensitive undo 502 may both be displayed in the menu. Upon clicking or selecting context sensitive undo 502, the user may initiate the context sensitive undo as described herein.

Figure 6:
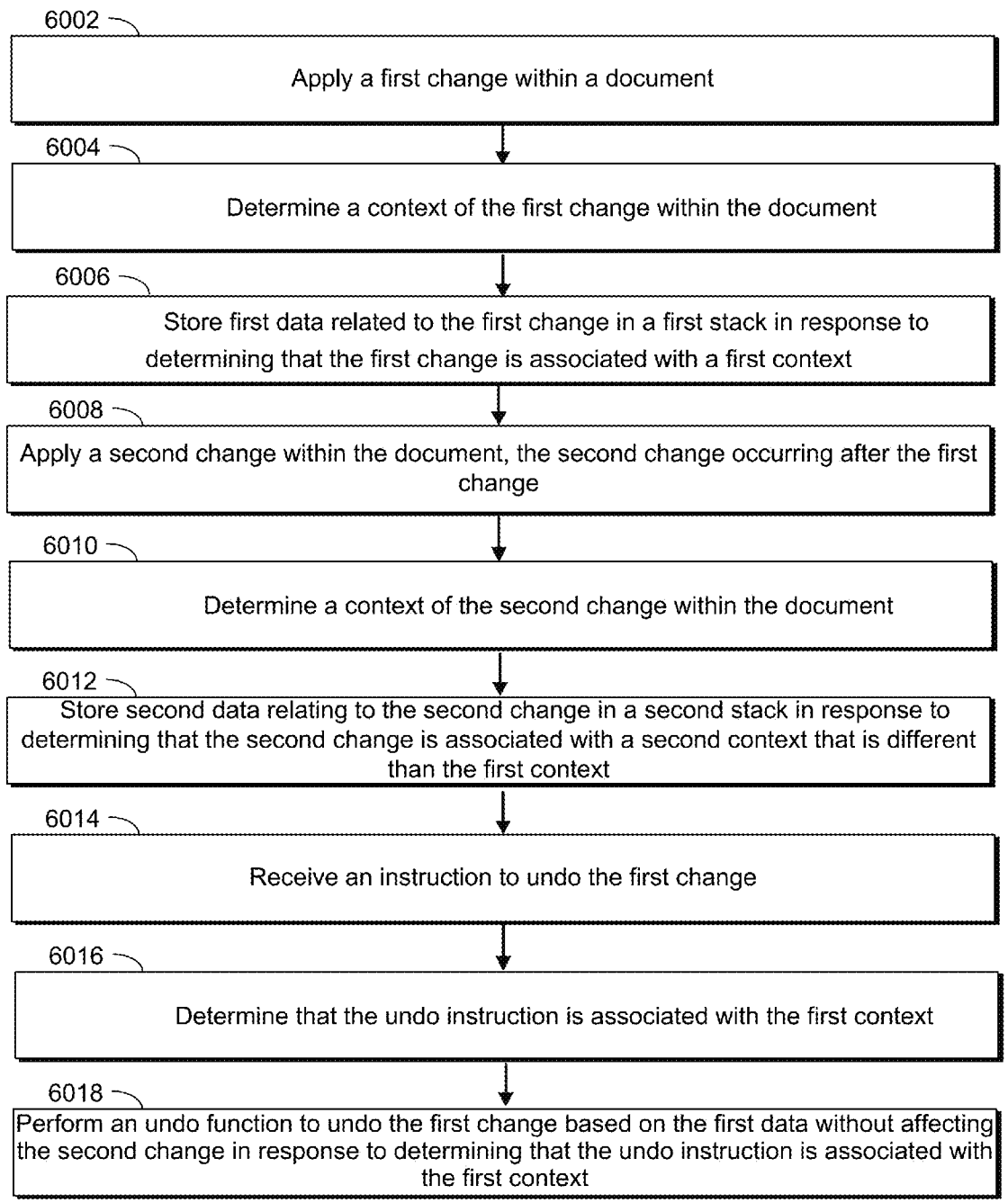
FIG. 6 illustratively depicts a flowchart of a method for applying a context sensitive undo function in accordance with an embodiment.

FIG. 6 illustratively depicts a flowchart of a method for applying a context sensitive undo in accordance with an embodiment. At step 6002, a first change is applied within a document. In the illustrative embodiment, document service provider 101 applies first change 418 within document 402. User device 103 sends a request to document service provider 101 via network 102 to apply first change 418. In the illustrated embodiment shown in FIG. 4A, first change 418 is contained within a request received from user device 103 to create an eyebrow to the drawing contained within first context 406. In response to the request, the image of document 402 is updated based on first change 418.

At step 6004, a context of the first change within the document is determined. Document service provider 101 determines a context of first change 418 within document 402. For example, it is determined that the context is a drawing.

At step 6006, first data related to the first change is stored in a first stack in response to determining that the first change is associated with a first context. Document service provider 101 stores first data 420 related to first change 418 in first stack 410 in response to determining that first change 418 is associated with first context 406, as shown in FIG. 4A.

At step 6008, a second change is applied within the document, the second change occurring after the first change. Document service provider 101 applies a second change 419 to second context 404 within document 402, the second change 419 occurring after first change 418. User device 103 sends a request to document service provider 101 via network 102 to apply second change 419. In the illustrated embodiment shown in FIG. 4A, second change 419 is contained within a request received from user device 103 to add text to the paragraph contained within second context 404. In response to the request, the image of document 402 is updated based on a second change 419.

At step 6010, a context of the second change within the document is determined. Document service provider 101 determines a context of second change 419 within document 402. For example, it is determined that the context is text.

At step 6012, second data related to the second change is stored in a second stack in response to determining that the second change is associated with a second context that is different than the first context. As shown in FIG. 4A, document service provider 101 stores second data 422 related to second change 419 in second stack 412 in response to determining that second change 419 is associated with second context 404 that is different than first context 406. In the illustrative embodiment, first context 406 is a drawing and is different than second context 404, which is text.

In another embodiment, context 404 and 406 may contain the same type of content. For example, context 404 and context 406 may both contain text, or may both be images.

Supposing that the user now wishes to undo first change 418 (but wishes to keep second change 419), the user selects the undo option 502, shown in FIG. 5. The context in which an undo function is to be applied may be determined based on user input or may be determined by identifying the "current" context. The user may cause a cursor to hover over first context 406 and select option 502. Other methods for selecting a current context are described below.

At step 6014, an instruction to undo the first change is received. Document service provider 101 receives an instruction (e.g. upon receiving selection of undo option 502) to undo first change 418 by user device 103 via network 102.

At step 6016, it is determined that the undo instruction is associated with the first context. Document service provider 101 determines that the undo instruction is associated with first context 406.

At step 6018, an undo function is performed to undo the first change based on the first data without affecting the second change in response to determining that the undo instruction is associated with the first context. Document service provider 101 retrieves first data 420 from first stack 410 and performs an undo function to undo first change 418 without affecting second change 419 (by removing first data 420 from first stack 410 and reversing first change 418) in response to determining that the undo instruction is associated with first context 406. First data 420 is then removed from first stack 410.

In one embodiment, a second instruction may be received by document service provider 101 to undo second change 419. Document service provider 101, in response, performs an undo function to undo the second change based on the second data without affecting the first change. In the illustrative embodiment in FIGS. 4A and 4B, document service provider 101 undoes second change 419 by removing second data 422 from second stack 412, and reversing second change 419, without affecting first context 406.

In one embodiment, document 402 may contain more than two types of context. For example, document 402 may contain a third context. Data related to changes made to the third context is stored in a third stack (not shown), independent of first stack 410 and second stack 412. A third change to a third context within the document is applied. A context of the third change is determined within the document. Third data relating to the third change in a third stack is stored in response to determining that the third change is associated with a third context. In one embodiment, first stack 410 and second stack 412 may be combined to generate a universal stack (not shown) that may store changes made to first context 406 and second context 404 in a stack. However, changes made to the third context would continue to be stored in the third stack. Any changes made to the first and second contexts would then be stored in the universal stack. In an embodiment, the third context is different than the first context. In another embodiment, the third context is different than the second context.

In accordance with an embodiment, changes made within document 402 to first context 406 are stored independently of changes made within document 402 to second context 404. As described above, changes made to first context 406 are stored in first stack 412 maintained in memory 308. Changes made to second context 404 are stored in second stack 412. When an undo command relating to first context 406 is received, the last change (e.g. first data 420) stored in first stack 410 is retrieved and undone without affecting second context 419 or second stack 412.

More specifically, in an embodiment, changes to first context 406 can be stored in first stack 410 and changes to second context 404 can be stored in second stack 412. The stacks are maintained in memory 308. In another embodiment, the stack(s) may be maintained only for the current session in which webpage 401 is active, accessed and/or being displayed at user device 103. In yet another embodiment, the stack(s) may be stored for longer than the current session (e.g. permanently or for the life of document 402).

In alternative embodiments, the stacks can be maintained in local memory at user device 103 or similarly, in local memory in an embodiment involving an application running on a standalone (e.g. non-networked) computer system.

In an embodiment, when a change is made to second context 404, the change may be stored within second stack 412 in a last in, first out order. Similarly, when a change is made to first context 406, the change may be stored within first stack 410 in a last in, first out order. Subsequently, when an undo command to undo the last change made to first context 406 is received, the most recent change stored in first stack 410 may be retrieved and undone without affecting second context 404 or second stack 412. In other words, separate stacks (also known as revision history tables) may be maintained for each context in a document. In another embodiment, revision history tables may include arrays or other data structures. Additionally, a global revision history table may be maintained, along with respective revision history tables for each context type, for document 404.

In alternate embodiments, the undo function may be selected through use of certain keystrokes or by any other method, including selection made via a touch-screen monitor. In an embodiment, webpage 401 which provides a visual representation of document 402 to the user, may provide two different undo icons: one for context sensitive undo and another for a global undo.

Figure 7:
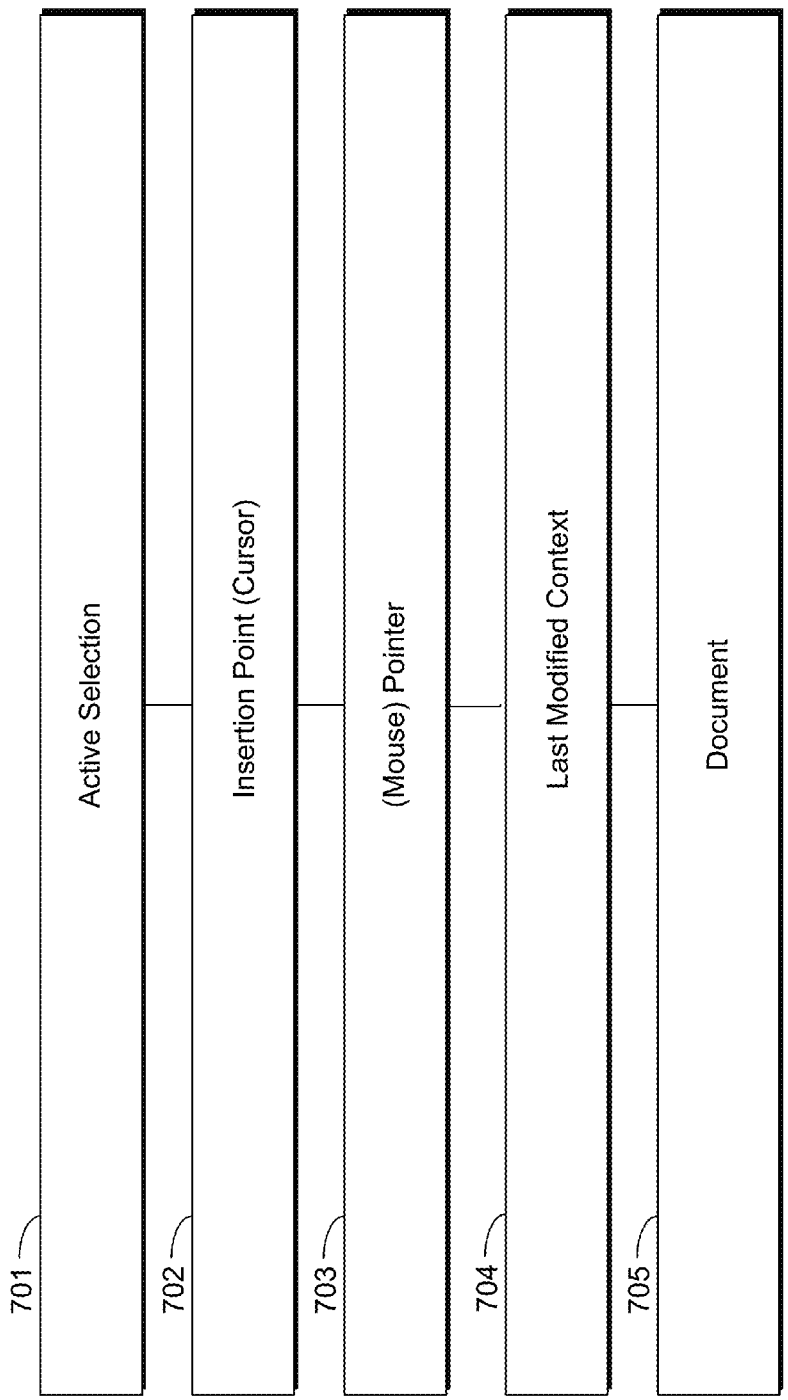
FIG. 7 illustratively depicts a hierarchy of criteria for selection in accordance with an embodiment.

In accordance with an embodiment, the content sensitive undo function described herein is applied to the current context type. In one embodiment, the current context type is determined based on a predetermined hierarchy. FIG. 7 represents a hierarchy of criteria used to select the current context for purposes of the context sensitive undo command. Criterion 701 is the highest priority criterion, wherein an "active selection" is made by a user using user device 103, by selecting a context. As defined by criterion 701, the context with the active selection is the current context. Active selection may be accomplished, for example, by highlighting a region of the document with the mouse pointer or via keystrokes on the keyboard. In the illustrative embodiment depicted by FIG. 5, first context 406 is actively selected and highlighted.

Criterion 702 has the second highest priority, wherein the context is indicated by the insertion point. As defined by criterion 702, the context with the insertion point (or cursor) is the current context. The insertion point may be the blinking text marker, which is widely used to show the point of the document at which the next character will appear upon pressing a key on the keyboard.

Criterion 703 has the third highest priority, wherein the context is indicated by the proximity to the pointer (or mouse pointer). As defined by criterion 703, the context closest to the pointer (or mouse pointer) is the current context.

Criterion 704 has the fourth highest priority, wherein the context is the last modified context. As defined by criterion 704, the last modified context is the current context.

Finally, criterion 705 has the least priority, wherein the context is the document itself.

Other hierarchies of criterion to select the current context may be utilized. The criterion set forth above may be used, or other criteria may be used. In other embodiments, the current context may be determined using other methods.

In one embodiment, performing an undo function to undo the first change based on the first data without affecting the second change is in response to receiving a selection of data contained within the first context. The selection of data may be chosen based on context criteria, as provided by FIG. 7.

In an embodiment, the context sensitive undo command automatically detects the context according to the placement of the cursor. The context may correspond to the currently selected editable field or location in the document. For example, if a user makes changes to a diagram, edits text in a different part of the document, and then returns to the diagram and initiates the context sensitive undo, only the changes to the diagram would be made. In other words, when a particular part of a document (e.g. a context comprising a picture) is selected by a user, the contextual undo command will only result in undoing edits contained in the revision history table corresponding to the that part of the document. Automatic selection of the revision history table (e.g. a stack) corresponding to the currently selected context may also be known as active selection.

When the undo command is received, the document service provider 101 references the revision history table corresponding to the current context. After the edit is undone to the current context, the edit is also removed from the revision history table.

In an embodiment, additional stacks pertaining to the undone edits can be maintained for each context in a document. Alternatively, in another embodiment, other data structures (e.g. an array with pointers) can store the entire history of edits. In embodiments in which undone edits are stored, these undos can be reversed through the use of a reverse command. For example, a redo command may be applied to restore first change 418 to first context 406. Of course, any undo commands may be reversed. For example, when an undo command removes data (e.g. first data 420 or second data 422) from a stack (e.g. first stack 410 or second stack 412), the data may be moved to one or more stacks (not shown) either temporarily or permanently. Once a "redo" command is received to redo a change, the data is moved from the one or more stacks back into the stack from which it was removed.

Figure 8:
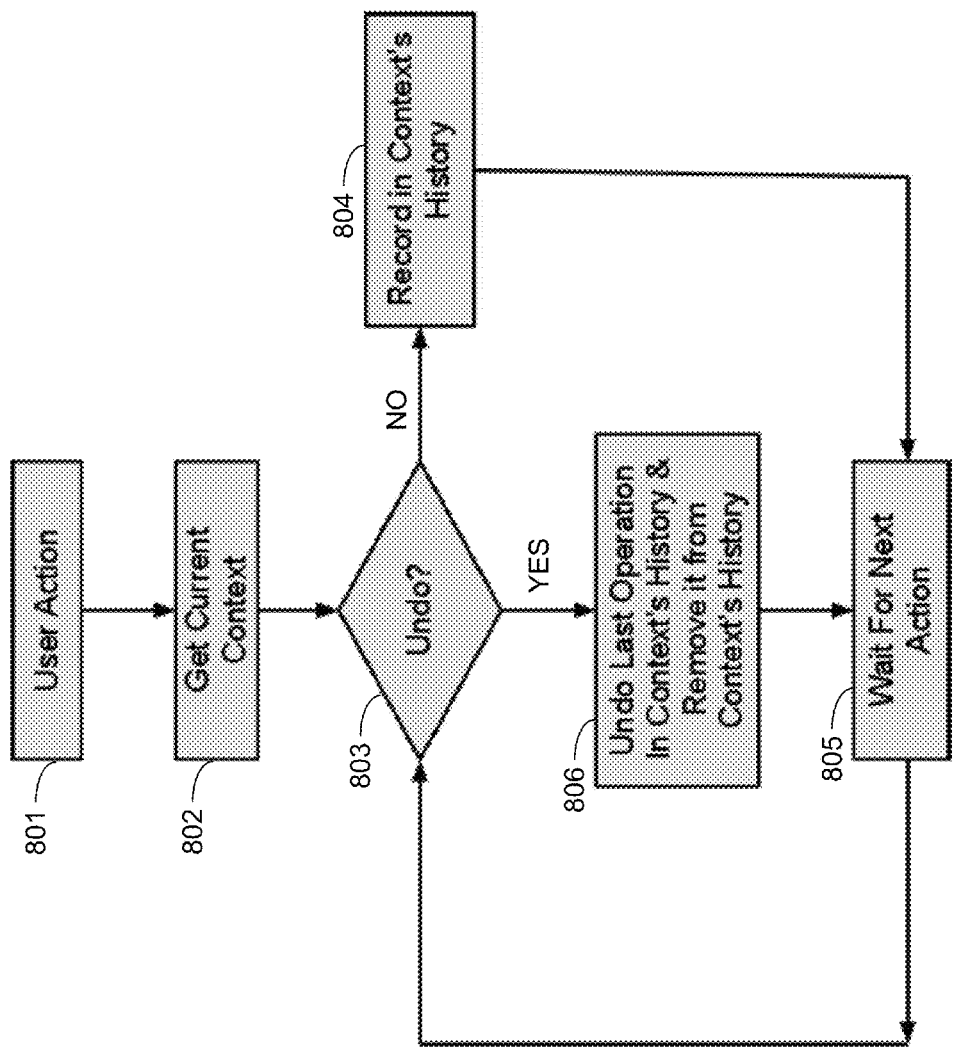
FIG. 8 illustratively depicts a flowchart for performing a context sensitive undo function in accordance with an embodiment.

FIG. 8 is a flowchart of a method for performing a contextual undo function. At step 801, a user initiates an action. For example, the user may add or delete text, or add a line to a diagram. At step 802, the system analyzes what the context of the edit was (also called the "current context"). For example, if text had been modified by the user, the context would be text. As discussed, in some embodiments, different paragraphs would include different contexts. At step 803, the undo command is either initiated or not initiated. In an embodiment, the undo command is the contextual undo as opposed to a regular undo. If the undo is not selected, the user action is recorded in the current context's history (e.g. revision history table or stack) at step 804. At step 805, the system waits for the next user action. If a new action is initiated, a new iteration of the flowchart is instantiated, again recording the user's action in the current context's history. If the undo command is given, step 806 is initiated. In step 806, the system undoes the last operation in the context's history and removes it from the history.

In another embodiment, an undo preview may be available. Where something has been added (rather than deleted), the preview may display the "undone" edit in another color, or using a highlight. The preview may be engaged through the use of a special icon, holding down an icon, right clicking on an icon, or through the use of a keystroke. In another embodiment, the undo preview may be automatically displayed for a predetermined time period in order to show the user what has just been undone.

In various embodiments, the method steps described herein, including the method steps described in FIGS. 6 and 8, may be performed in an order different from the particular order described or shown. In other embodiments, other steps may be provided, or steps may be eliminated, from the described methods.

Systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be used within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the method steps described herein, including one or more of the steps of FIGS. 6 and 8. Certain steps of the methods described herein, including one or more of the steps of FIGS. 6 and 8, may be performed by a server or by another processor in a network-based cloud-computing system. Certain steps of the methods described herein, including one or more of the steps of FIGS. 6 and 8, may be performed by a client computer in a network-based cloud computing system. The steps of the methods described herein, including one or more of the steps of FIGS. 6 and 8, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIGS. 6 and 8, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 9:
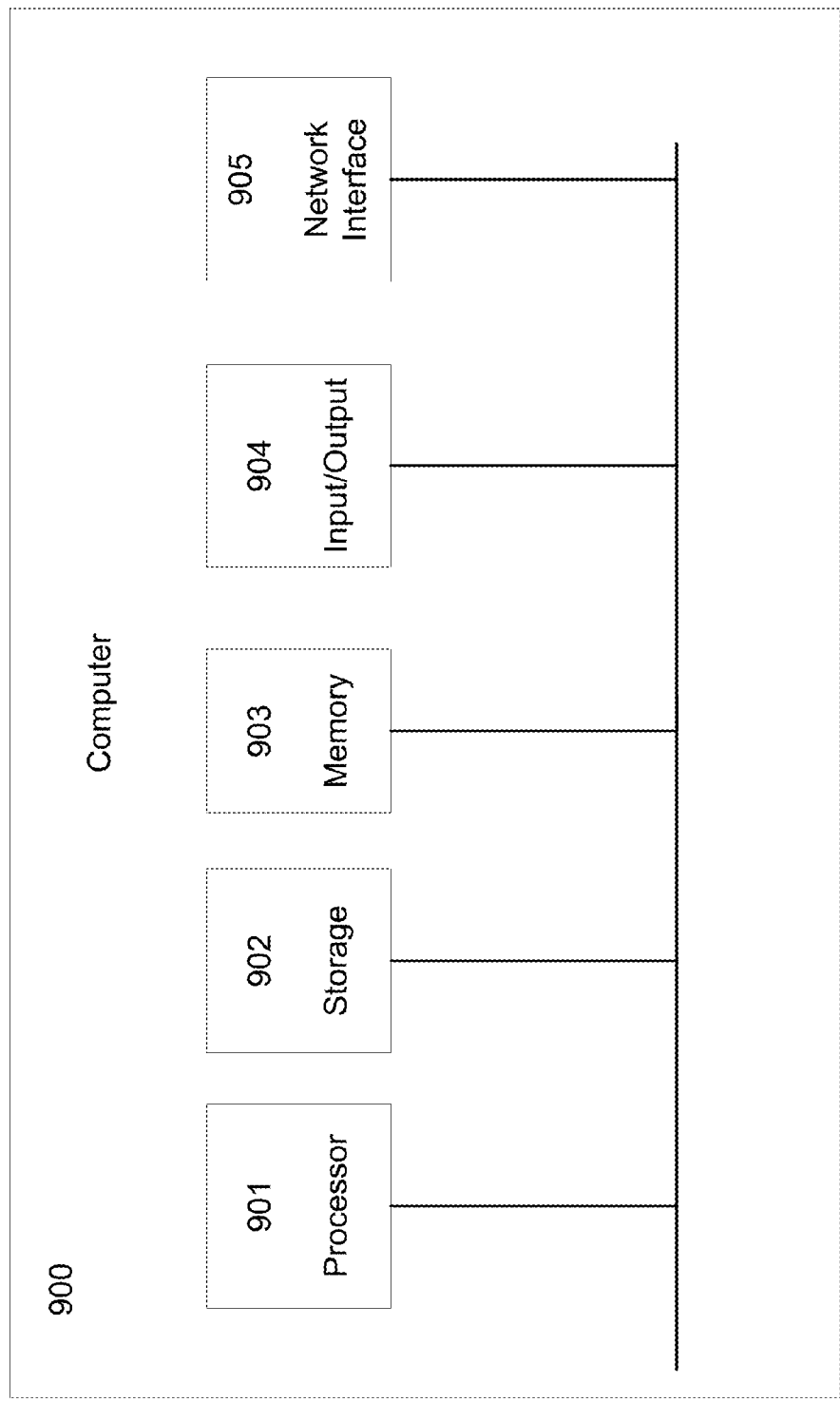
FIG. 9 illustratively depicts components of a computer that may be used to implement the invention.

A high-level block diagram of an exemplary computer that may be used to implement systems, apparatus and methods described herein is illustrated in FIG. 9. Computer 900 includes a processor 901 operatively coupled to a data storage device 902 and a memory 903. Processor 901 controls the overall operation of computer 900 by executing computer program instructions that define such operations. The computer program instructions may be stored in data storage device 902, or other computer readable medium, and loaded into memory 903 when execution of the computer program instructions is desired. Thus, the method steps of FIGS. 6 and 8 can be defined by the computer program instructions stored in memory 903 and/or data storage device 902 and controlled by the processor 901 executing the computer program instructions. For example, the computer program instructions can be implemented as computer executable code programmed by one skilled in the art to perform an algorithm defined by the method steps of FIGS. 6 and 8. Accordingly, by executing the computer program instructions, the processor 901 executes an algorithm defined by the method steps of FIGS. 6 and 8. Computer 900 also includes one or more network interfaces 904 for communicating with other devices via a network. Computer 900 also includes one or more input/output devices 905 that enable user interaction with computer 900 (e.g., display, keyboard, mouse, speakers, buttons, etc.).

Processor 901 may include both general and special purpose microprocessors, and may be the sole processor or one of multiple processors of computer 900. Processor 901 may include one or more central processing units (CPUs), for example. Processor 901, data storage device 902, and/or memory 903 may include, be supplemented by, or incorporated in, one or more application-specific integrated circuits (ASICs) and/or one or more field programmable gate lists (FPGAs).

Data storage device 902 and memory 903 each include a tangible non-transitory computer readable storage medium. Data storage device 902, and memory 903, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 905 may include peripherals, such as a printer, scanner, display screen, etc. For example, input/output devices 905 may include a display device such as a cathode ray tube (CRT) or liquid crystal display (LCD) monitor for displaying information to the user, a keyboard, and a pointing device such as a mouse or a trackball by which the user can provide input to computer 900.

Any or all of the systems and apparatus discussed herein, including document service provider 101, user device 103, and components thereof, including web browser 201, display 202, processor 306, website 310, application 304, and memory 308, may be implemented using a computer such as computer 900.

One skilled in the art will recognize that an implementation of an actual computer or computer system may have other structures and may contain other components as well, and that FIG. 9 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:
1. A method comprising:
applying a first change within a document;
determining a context of the first change within the document;
storing first data related to the first change in a first stack corresponding to a first context in response to determining that the first change is associated with the first context;
applying a second change within the document, the second change occurring after the first change;
determining a context of the second change within the document, wherein the context of the second change is a different type of context than the context of the first change;
storing second data relating to the second change in a second stack corresponding to a second context that is different than the first context in response to determining that the second change is associated with the second context;
determining a current context type based on a hierarchy of criteria, wherein the hierarchy of criteria comprises a first priority criterion being an active selection of the current context and a second priority criterion being an insertion point of the current context;
receiving an instruction to undo a change associated with the current context type;

determining that the instruction to undo is associated with the first context; and performing an undo function to undo the first change based on the first data without affecting the second change in response to determining that the undo instruction is associated with the first context.

2. The method of claim 1 wherein performing an undo function to undo the first change based on the first data without affecting the second change is in response to receiving a selection of data contained within the first context.

3. The method of claim 1 further comprising:
displaying, on a webpage, the first context and the second context.

4. The method of claim 1 further comprising:
applying a redo command to restore the first change to the first context.

5. The method of claim 1 further comprising:
receiving a second instruction to undo the second change; and
performing an undo function to undo the second change based on the second data without affecting the first context.

6. The method of claim 1 further comprising:
applying a third change within the document;
determining a context of the third change within the document;
storing third data related to the third change in a third stack in response to determining that the third change is associated with a third context; and
combining the first stack and the second stack to generate a universal stack.

7. The method of claim 6 wherein the third context is different than the first context.

8. The method of claim 6 wherein the third context is different than the second context.

9. A non-transitory computer readable medium having program instructions stored thereon, the instructions capable of execution by a processor and defining the steps of:
applying a first change within a document;
determining a context of the first change within the document;
storing first data related to the first change in a first stack corresponding to a first context in response to determining that the first change is associated with the first context;
applying a second change within the document, the second change occurring after the first change;
determining a context of the second change within the document, wherein the context of the second change is a different type of context than the context of the first change;
storing second data relating to the second change in a second stack corresponding to a second context that is different than the first context in response to determining that the second change is associated with the second context;
determining a current context type based on a hierarchy of criteria, wherein the hierarchy of criteria comprises a first priority criterion being an active selection of the current context and a second priority criterion being an insertion point of the current context;
receiving an instruction to undo a change associated with the current context type;
determining that the instruction to undo is associated with the first context; and
performing an undo function to undo the first change based on the first data without affecting the second change in response to determining that the undo instruction is associated with the first context.

10. The non-transitory computer readable medium of claim 9, wherein performing an undo function to undo the first change based on the first data without affecting the second change is in response to receiving a selection of data contained within the first context.

11. The non-transitory computer readable medium of claim 9 further comprising instructions defining the step of:
displaying, on a webpage, the first context and the second context.

12. The non-transitory computer readable medium of claim 10 further comprising instructions defining the step of:
applying a redo command to restore the first change to the first context.

13. The non-transitory computer readable medium of claim 9 further comprising instructions defining the steps of:
receiving a second instruction to undo the second change; and
performing an undo function to undo the second change based on the second data without affecting the first context.

14. The non-transitory computer readable medium of claim 9 further comprising instructions defining the steps of:
applying a third change within the document;
determining a context of the third change within the document;
storing third data related to the third change in a third stack in response to determining that the third change is associated with a third context; and combining the first stack and the second stack to generate a universal stack.

15. The non-transitory computer readable medium of claim 14, wherein the third context is different than the first context.

16. The non-transitory computer readable medium of claim 14, wherein the third context is different than the second context.

17. An apparatus comprising:
a processor; and
a memory to store computer program instructions, the computer program instructions when executed on the processor cause the processor to perform operations comprising:
applying a first change within a document;
determining a context of the first change within the document;
storing first data related to the first change in a first stack corresponding to a first context in response to determining that the first change is associated with the first context;
applying a second change within the document, the second change occurring after the first change;
determining a context of the second change within the document, wherein the context of the second change is a different type of context than the context of the first change;
storing second data relating to the second change in a second stack corresponding to a second context that is different than the first context in response to determining that the second change is associated with the second context;
determining a current context type based on a hierarchy of criteria, wherein the hierarchy of criteria comprises a first priority criterion being an active selection of the current context and a second priority criterion being an insertion point of the current context;
receiving an instruction to undo a change associated with the current context type;

determining that the instruction to undo is associated with the first context; and performing an undo function to undo the first change based on the first data without affecting the second change in response to determining that the undo instruction is associated with the first context.

\* \* \* \* \*